July 10, 1962 A. H. TILLOTSON 3,043,397
DEER STAND
Filed Aug. 14, 1961 2 Sheets-Sheet 1
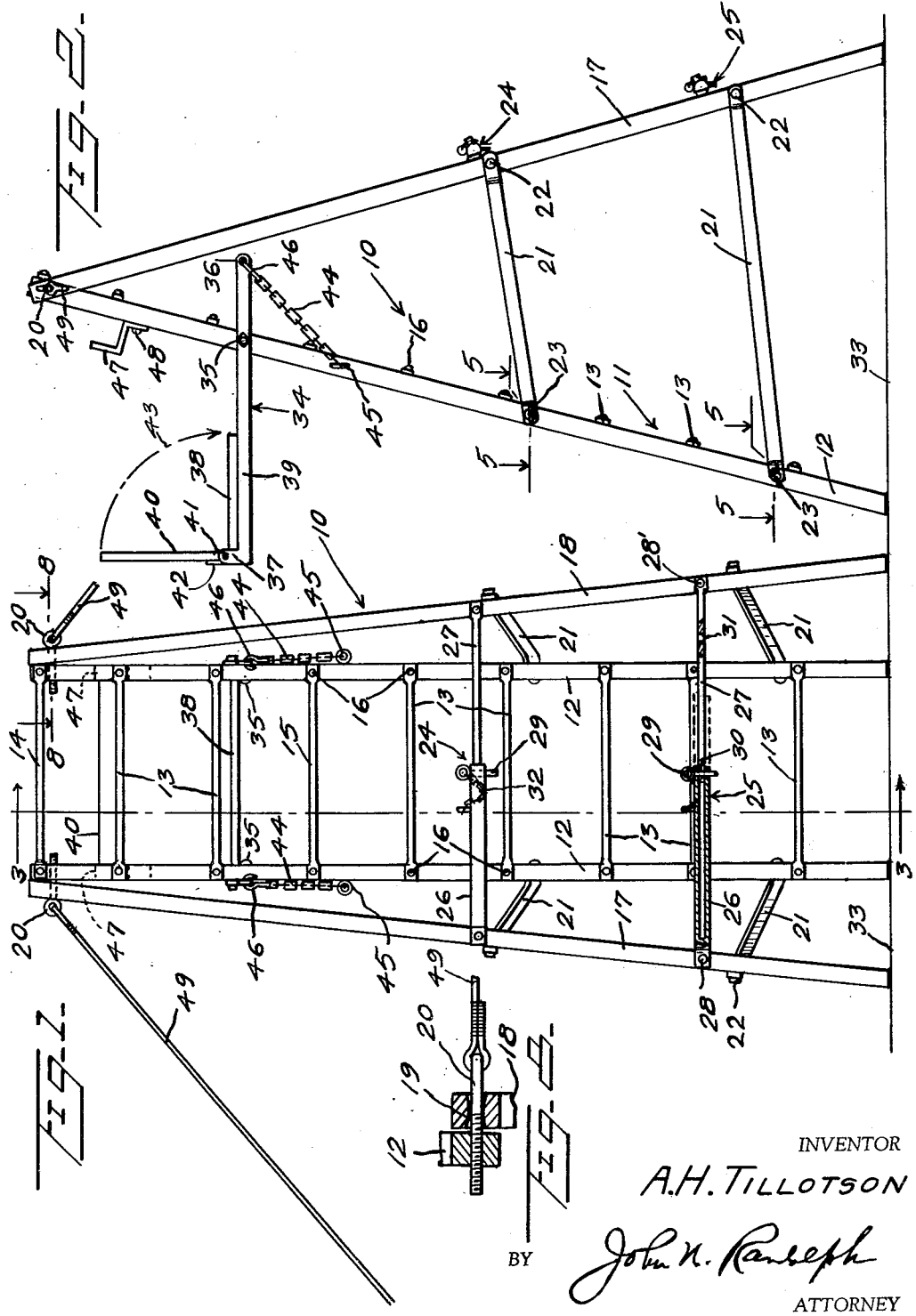
INVENTOR
A.H. TILLOTSON
BY John N. Randolph
ATTORNEY

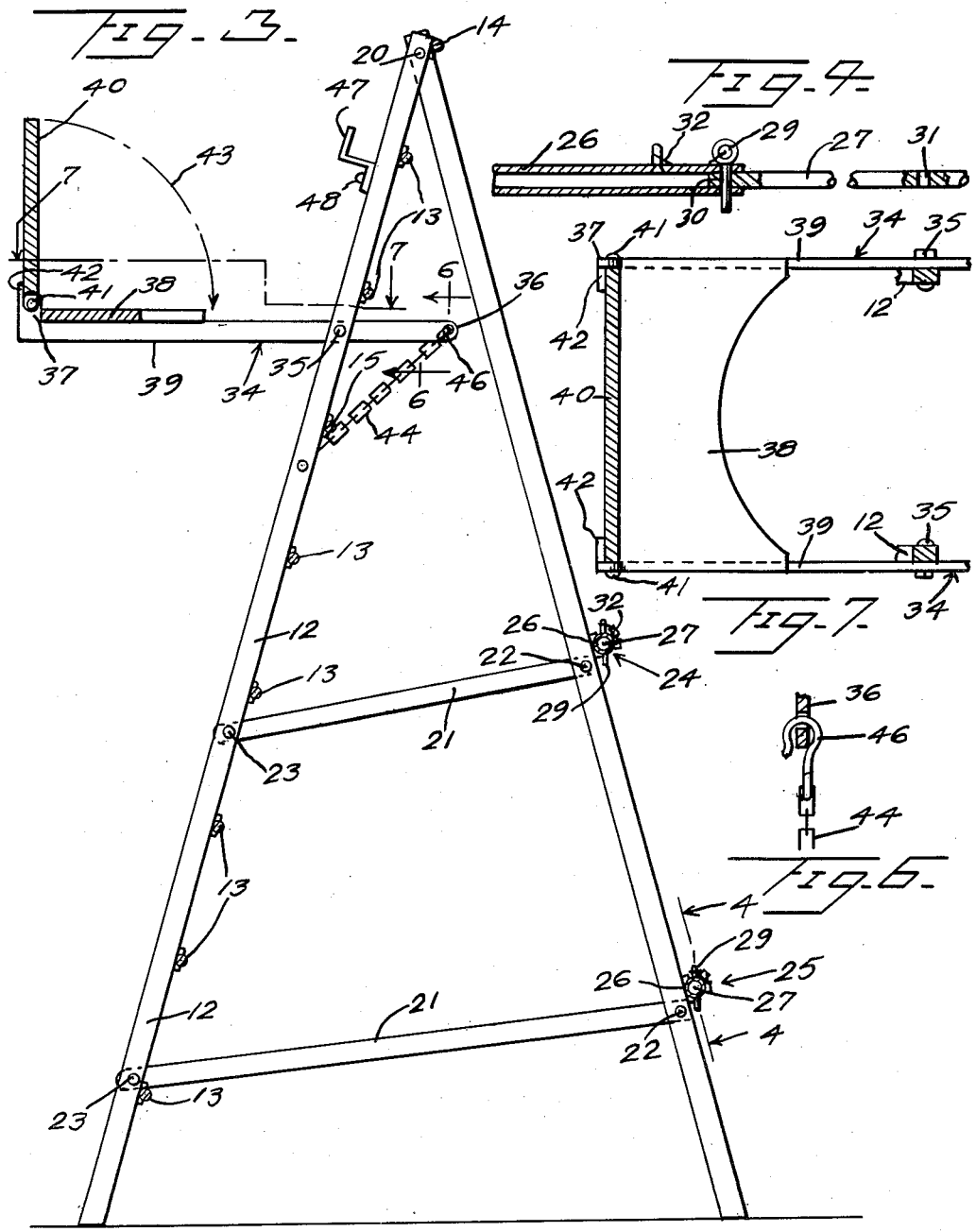

United States Patent Office 3,043,397
Patented July 10, 1962

3,043,397
DEER STAND
Allen Horton Tillotson, 601 22nd St., Hondo, Tex.
Filed Aug. 14, 1961, Ser. No. 131,150
1 Claim. (Cl. 182—124)

This invention relates to a portable and collapsible deer stand which may be readily positioned in a location affording good natural concealment and a good field of fire, and which is capable of supporting a deer hunter in an elevated position.

More particularly, it is an object of the present invention to provide a deer stand including an elevated seat on which the hunter can sit comfortably viewing the terrain until a target appears.

Another object of the invention is to provide a deer stand for supporting the hunter in a standing position, after rising from the seat, and from which standing position the hunter can readily fire over the stand and while braced thereby.

Still another object of the invention is to provide a deer stand which is collapsible and foldable, enabling it to be readily transported on a vehicle and readily carried manually to a location in which it is to be used, and which stand can be readily extended to provide a stable, substantially upright support.

Various other objects and advantages of the invention will hereinafter become more fully apparent from the following description of the drawings, illustrating a presently preferred embodiment thereof, and wherein:

FIGURE 1 is a fragmentary front elevational view of the deer stand, looking from right to left of FIGURE 2;

FIGURE 2 is a fragmentary side elevational view thereof, looking from left to right of FIGURE 1;

FIGURE 3 is an enlarged vertical sectional view taken substantially along a plane as indicated by the line 3—3 of FIGURE 1;

FIGURE 4 is an enlarged fragmentary sectional view, partly in elevation, taken substantially along the line 4—4 of FIGURE 3;

FIGURE 5 is an enlarged fragmentary sectional view taken substantially along the line 5—5 of FIGURE 2;

FIGURE 6 is an enlarged fragmentary sectional view, taken substantially along the line 6—6 of FIGURE 3;

FIGURE 7 is a fragmentary horizontal sectional view taken substantially along the line 7—7 of FIGURE 3, and FIGURE 8 is an enlarged fragmentary horizontal sectional view taken substantially along a plane as indicated by the line 8—8 of FIGURE 1.

Referring more specifically to the drawings, the deer stand in its entirety is designated generally 10 and includes a straight ladder 11 composed of spaced substantially parallel side rails 12 which are connected by a plurality of spaced rungs 13, a top rung 14 and a rung 15. The rungs 13, 14 and 15 are secured to the rails 12 by suitable fastenings 16.

The stand 10 includes a pair of brace legs 17 and 18 which are of approximately the same length as the side rails 12 and each of which has an opening 19 adjacent an upper end thereof. The upper ends of the brace legs 17 and 18 straddle the upper end of the ladder 11 and said brace legs are swingably connected at their upper ends to the upper ends of the side rails 12, located adjacent thereto, by eyebolts 20, as best seen in FIGURE 8, which extend loosely inward through the openings 19 and which are anchored in the side rails 12, beneath and adjacent the top rung 14. The loose engagement of the openings 19 with the bolts 20 permit the brace legs 17 and 18 to swing about a plurality of axes, toward and away from the plane of the ladder 11 and toward and away from one another, such that the brace legs can assume positions substantially parallel to one another and to the side rails 12, or positions in downwardly diverging relation to one another, as seen in FIGURE 1.

A pair of side braces 21 detachably connect each brace leg to the ladder side rail to which it is pivoted. The side braces 21 are pivotally connected by fastenings 22 to the brace legs and the fastenings 22 of each brace leg are longitudinally spaced relative to one another. The other ends of the side braces 21 are detachably secured by bolt and wing nut fastenings 23 to the side rails 12. As seen in FIGURES 1 and 2, the side braces 21 are disposed on the outer sides of the side rails 12 and brace legs 17 and 18 and are so shaped, as seen in FIGURE 1, that the side braces of the two brace legs converge relative to one another from said brace legs toward the ladder 11.

The two brace legs 17 and 18 are connected to one another by a pair of longitudinally spaced cross braces 24 and 25, each of which includes a tubular section 26 having one end secured by a fastening 28 to the brace leg 17, and a rod section 27 having one end pivotally connected by a fastening 28' to the brace leg 18. The other end of the rod section 27 fits telescopically in the other end of the tube section 26. A headed pin 29 engages detachably through the tubular section 26, near its last mentioned end, and selectively through either an opening 30 or an opening 31 of the rod 27 for securing the cross brace 24 or 25 in either an extended position, as shown in full lines in FIGURE 1, or in a retracted position, as shown in dotted lines in said figure. The pin 29 is tethered to the tubular section 26 by a flexible element 32. When the pins 29 engage the openings 30 to secure the cross braces 24 and 25 in their extended positions, the brace legs 17 and 18 extend downwardly in diverging relation to one another, as seen in FIGURE 1, and if the side braces 21 are also connected by the fastenings 23 to the rails 12, the stand 10 will be in its extended position of FIGURES 1 and 2 with the brace legs 17 and 18 rigidly connected to one another and to the ladder 11, so that the stand 10 will assume an upright position when the lower ends of the side rails 12 and brace legs 17 and 18 are resting on a supporting surface 33. The spacing between the lower ends of the brace legs and the lower end of the ladder provides a stable support which will prevent the ladder from overturning from front to rear or rear to front, as seen in FIGURE 2. The downwardly divergent relationship of the brace legs 17 and 18 will effectively function to prevent the stand from overturning sidewise, to either the right or left as seen in FIGURE 1.

A pair of bars 34 forming a seat frame straddle the ladder 11, near its upper end, and said bars are pivotally connected by fastenings 35 to the outer sides of the rails 12. The fastenings 35 are spaced from the ends of the bars 34 and are located nearer the apertured ends 36 thereof than the other longer ends which terminate in upturned extensions 37. A seat 38 is supported on and secured in any suitable manner to the longer bar ends 39 and the lower end of a back rest 40 is disposed between and is pivotally connected to the extensions 37 by fastenings 41. As seen in FIGURE 7, the extensions 37 have portions which bear against the back rest 40 to provide stops 42 to prevent swinging movement of the back rest, in a direction away from the seat 38, beyond an upright position, as seen in FIGURES 3 and 7. The back rest 40 is swingable downwardly to a folded position on the upper side of the seat 38, as indicated by the arrow tipped broken lines 43 in FIGURES 2 and 3. The longer bar ends 39 extend outwardly from the ladder 11, in a direction away from the brace legs 17 and 18, and the shorter apertured bar ends 36 extend from said ladder toward the brace legs, when the seat frame is in an extended position for use, as seen in FIGURES 1 to 3. Chains or other nonelastic flexible elements 44 are anchored by eyes 45 to the outer sides of the rails 12, below the pivots 35, and have free ends provided with hooks 46 which detachably engage the apertured bar ends 36 for supporting the seat frame bars in their operative positions.

A hunter may climb the outer side of the ladder 11 and pass between the frame bars 34 and between the seat 38 and ladder 11 to assume a position where he can sit upon the seat 38 with his back against the back rest 41 and with his feet resting on the rung 15. Rack members 47 are secured by fastenings 48 to the outer edges of the rails 12, above the level of the bars 34, to provide a rack for supporting a firearm, not shown, in a position convenient to be grasped by the occupant of the seat 38. To fire from the stand 10, the hunter may stand upon the rung 15 and lean against the upper portion of the ladder 11 with his upper arms resting on the top rung 14 in order to brace himself to aim and fire a rifle.

By disconnecting the hooks 46 from the apertured bar ends 36, the bars 34 can swing counterclockwise about their pivots 35 so that the seat 38 and folded back rest 41 will lie along the ladder 11 below the pivots 35. The cross braces 24 and 25 can be retracted, as previously described, to position the brace legs 17 and 18 substantially parallel to one another, and the side braces 21 can be disconnected from the fastenings 23 so that the side braces 21 can be folded along the brace legs 17 and 18, and said brace legs can assume folded positions along outer sides of the ladder rails 12. With the stand thus folded, it may be readily transported on a vehicle and may be readily carried from its location of use to the vehicle.

Guy lines or cables 49 are secured to the outer ends of the eyebolts 20 and extend downwardly therefrom in diverging relation to one another and may be anchored at their opposite ends, not shown, to any suitable anchorage to assist in maintaining the stand 10 in its upright position and to counteract any tendency of the stand to overturn from right to left, as seen in FIGURE 2, due to the weight of the hunter sitting on the seat 38. For this latter purpose, the cables 49 preferably extend downwardly and in a direction away from the ladder 11.

Various modifications and changes are contemplated and may be resorted to, without departing from the function or scope of the invention as hereinafter defined by the appended claim.

I claim as my invention:

A deer stand comprising a ladder including side rails connected by spaced rungs and having an upper end and a lower end, a pair of brace legs having upper ends straddling the upper end of the ladder, means pivotally connecting the upper ends of the brace legs to the upper end of the ladder for swinging movement of the brace legs toward and away from the plane of the ladder and toward and away from one another, side braces connected to the brace legs and detachably connected to the ladder for positioning the brace legs coplanar to one another and at an acute angle to the plane of the ladder, at least one cross brace extending between and connected to said brace legs and cooperating with said side braces to retain the brace legs rigid relaive to one another and to the ladder, said cross brace comprising extensibly connected sections for varying the spacing between the brace legs at the point of attachment of the cross brace thereto, a seat structure comprising a pair of arms each having an inner end and an outer end, said arms straddling said side rails, means pivotally connecting the arms, near said inner ends, to the side rails for swinging movement of the arms about a common axis disposed adjacent the upper end of the ladder, means anchored to the ladder, below the arm pivots, and detachably connected to the inner ends of said arms for supporting the arms in substantially a horizontal position, a seat member mounted on and secured to said arms adjacent their outer ends and supported thereby spaced outwardly from the ladder, said arms having upstanding extensions at their outer ends, and a back rest pivotally connected to said extensions for pivotally movement between an upright operative position behind the seat member and a folded position overlying said seat member, said seat structure being swingable to a folded position against and partially straddling the ladder when said arms are disconnected from said last mentioned means.

References Cited in the file of this patent
UNITED STATES PATENTS

| 1,778,898 | Konigsberg | Oct. 21, 1930 |
| 2,007,057 | McNeal | July 2, 1935 |